3,560,916
LOCATOR SIGNAL SYSTEM FOR VEHICLE TRANSPORTABLE SIGNAL GENERATORS
William T. Buckingham, 2580 Africa Road, Box 125B, Galena, Ohio 43021, and Gordon R. Hammon, Fairview Park, Ohio (Windsor Drive, Amherst, N.H. 03031)
Filed Dec. 12, 1966, Ser. No. 601,036
Int. Cl. G08g 1/12
U.S. Cl. 340—23                                    2 Claims

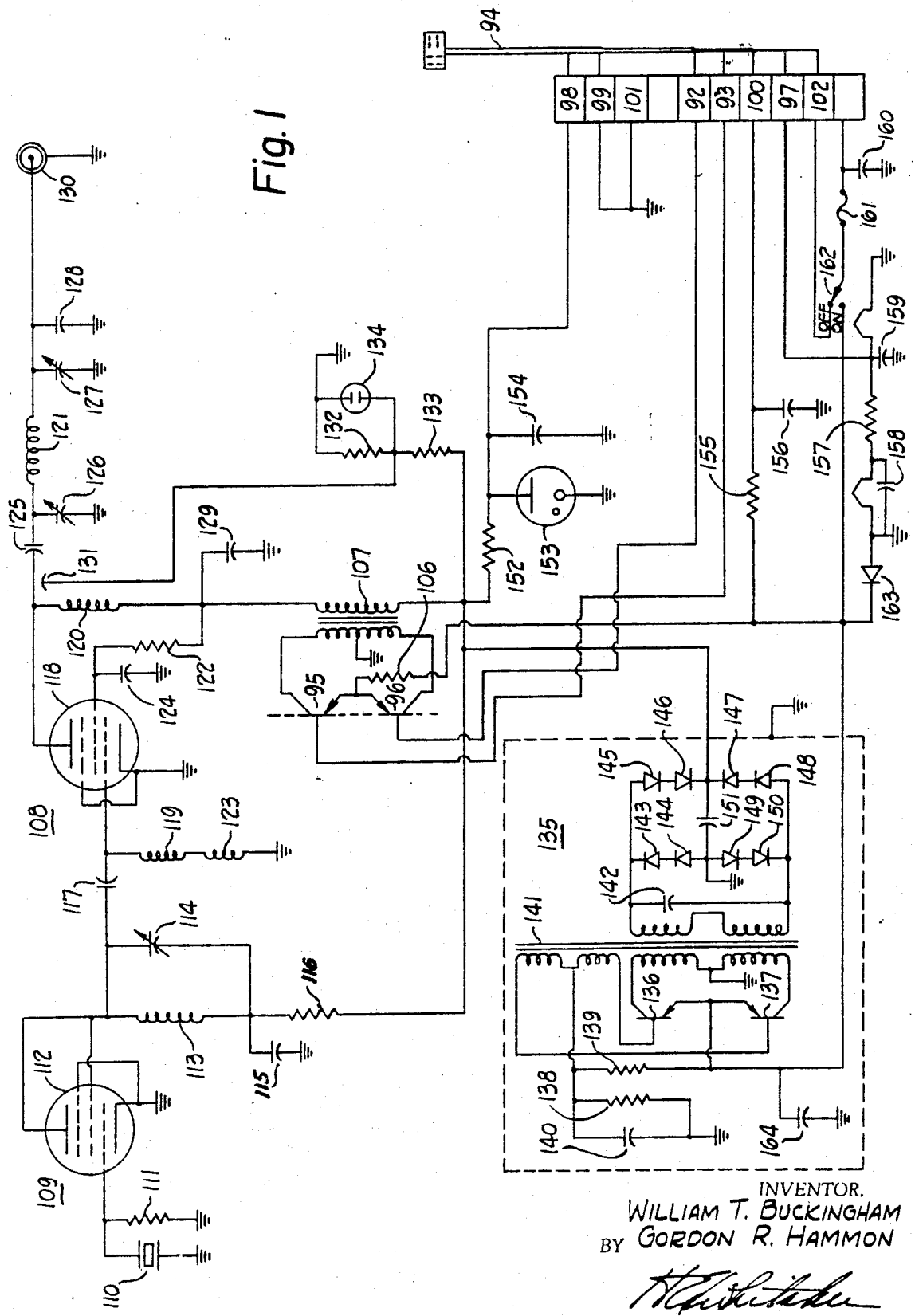

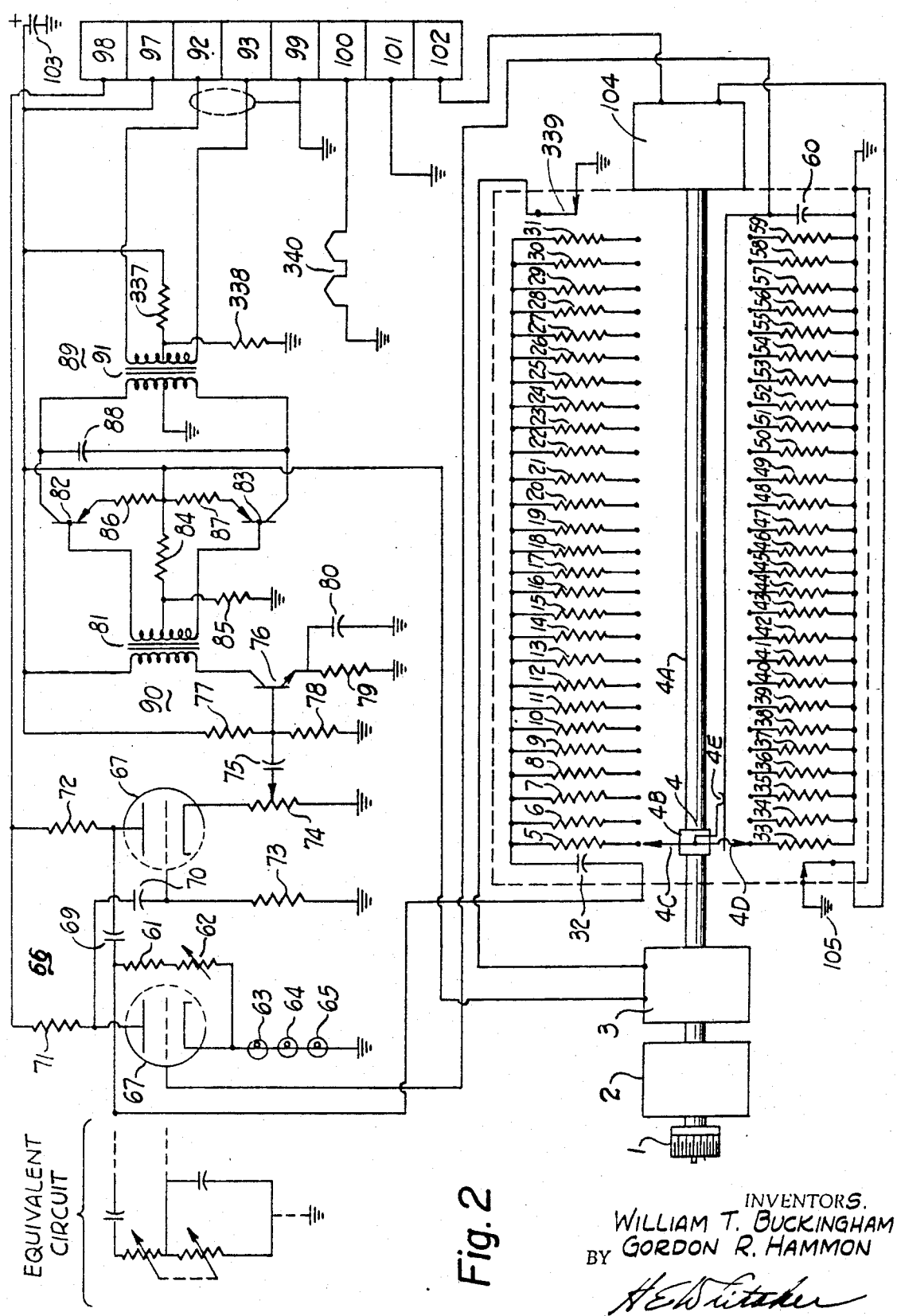

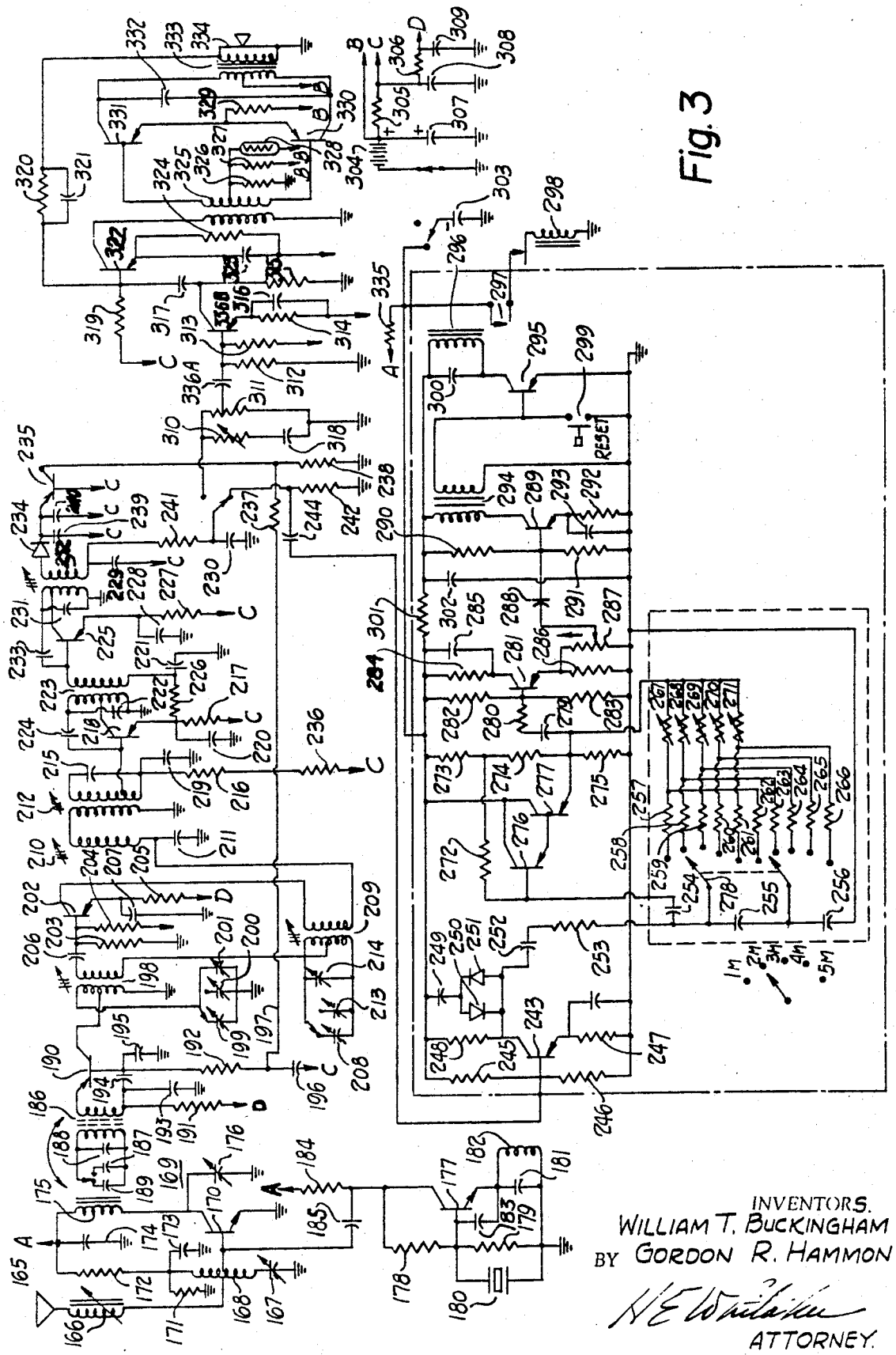

ABSTRACT OF THE DISCLOSURE

A transportable electronic signalling equipment carried by a vehicle with means for activation through mechanical linkage with the distance measuring equipment of the vehicle, and comprising a mechanical switching assembly causing it to advance modulating the radio frequency of the transmitted signal at predetermined locations, the modulation occurring in such a manner as to indicate upon multiple receivers the one mile segment of proximity separating the transmitter and receivers through upward shifts of the freqency of oscillation of approximately one hundred cycles per second, the receivers being tuned to receive and be activated by only the desired segment of transmitter freqency of oscillation, amplified, relayed to visual or audible warning system to give the desired proximity information of the vehicular approach.

---

This invention relates to electronic signaling equipment and more particularly to a signal system wherein a transmitter is carried by a vehicle with receivers in various locations, any one of such receivers being capable of determining the location of the vehicle from signals transmitted thereby.

One of the objects of this invention is to provide a system capable of determining the proximity of a vehicle wherein a predetermined signal is transmitted during the travel of the vehicle over segments of the route, a receiver being provided which is tuned to the signals in such a manner as to indicate a segment in which the vehicle is located.

In the past there has been no apparatus capable for family use which would indicate the proximity of a school bus or similar vehicle. The apparatus which forms the preferred embodiment of our invention is capable of such warning thus permitting the children to remain in the home away from exposure to the weather or traffic hazards until the school bus approaches the pick up location.

As the vehicle carrying the transmitter travels along a prescribed route, the rotation of the speedometer cable actuates a mechanical switching assembly causing it to advance, changing the freqency of a wien bridge oscillator. The frequency of the oscillator changes in a stepwise manner such that the freqency of oscillation is constant over any one mile interval. At the end of the one mile interval, the frequency of oscillation is shifted upward approximately 100 cycles per second by the advance of the mechanical switching assembly. The oscillation frequency is modulated on the frequency carrier which is radiated by an antenna on the vehicle.

A receiver, or receivers, is located to provide information to listener as desired and is tuned to the frequency of the transmitter, the signal being amplified and detected with further amplification of the audio signal. This amplified audio signal is then fed to a highly selective regenerative amplifier. If the components in the regenerative amplifier are of appropriate predetermined values, a high gain will result over a very narrow band of frequencies. If the modulating frequency of the transmitter falls within the bandwidth of the regenerative amplifier, there will be a large output from the regenerative amplifier. Conversely, if the transmitter modulating frequency falls outside the bandwidth of the regenerative amplifier, there will be little or no output.

The output of the regenerative amplifier is then re-amplified and provides sufficient power to actuate a relay. The actuation of the relay causes an alarm to sound. It is understood that the components of the regenerative amplifier in any particular receiver may be interchanged in sets so that with any set of components the regenerative amplifier will have optimum operation at one of the various transmitter modulating frequencies.

Applying the function of the apparatus to the use as an early warning device, if each modulating frequency of the transmitter corresponds to a one mile interval on the prescribed route, and if a given receiver has a regenerative amplifier which may be tuned to any of the various modulating freqencies, the receiver may serve as an indication of which one mile interval the vehicle is traveling in, simply by noting which regenerative amplifier frequency actuates the associated alarm in the receiver.

It is a further object of this invention to provide signal apparatus wherein a transmitter carried by a vehicle emits a signal which is oriented to the location of the vehicle along its route, a receiver being provided capable of analyzing the signal and giving an indication of the location on the route at which the vehicle is positioned at any particular time.

A still further object of the invention is to provide a signal apparatus wherein a transmitter carried by a vehicle is controlled by a switching arrangement actuated from the chassis of the vehicle, the switching arrangement altering the frequency which modulates the signal from the transmitter in direct relation to the position of the vehicle along its route of travel.

Another object of this invention is to provide a radio receiving apparatus capable of analyzing a signal emitted from a transmitter on a vehicle, such signal having positions on the route of travel of the vehicle, said receiver being capable of providing an indication of the location of the vehicle during its passage through its route.

Other objects and advantages more or less ancillary to the foregoing, and the manner in which all the various objects are realized, will appear in the following description, which, considered in conection with the accompanying drawings, set forth the preferred embodiment of our invention.

In the drawings:

FIG. 1 shows a transmitter unit that is utilized in the preferred embodiment of our invention exclusive of audio signal generation and modulator driver circuitry;

FIG. 2 illustrates the audio generation and modulator driver circuitry for the transmitting unit of FIG. 1; and FIG. 3 illustrates the receiver circuitry for use with the transmitter of FIGS. 1 and 2.

Referring first to FIG. 2 which illustrates the audio generation circuitry and the modulator driver circuitry for the transmitter unit of FIG. 1, the apparatus described therein illustrates the preferred embodiment of our invention and the specific nature of the disclosure is not intended to be limiting to the invention. As the vehicle which carries the transmitter and whose location is to be signaled to receivers at various locations, the speedometer cable of the vehicle rotates in ratio to the distance traveled over the predetermined route. This rotational information is transmitted by way of input coupling 1 to a speed reduction gear box 2. The output of the speed reduction gear box 2 which operates at a greatly reduced speed as compared to the speed of the input coupling 1, is coupled by way of an electro-mechanical clutch 3 to a mechanical switching assembly 4. The mechanical switching assembly 4 comprises a lead screw 4A rotatably mounted and threaded for engagement with insulated sleeve 4B which carries three wipers 4C, 4D, and 4E. The lead screw is threaded in such a manner that when the lead screw 4A rotates, the insulated sleeve 4B is forced to travel down the length of the screw one inch for every 32 turns of the lead screw 4A. The wipers 4C, 4D, and 4E form a common connection to pairs of contacts. These contacts are connected to resistors 5 through 31 and 33 through 59 respectively so that in moving down the lead screw 4A, pairs of resistors are connected in sequential order, i.e., 5 and 33, 6 and 34, 7 and 35, etc., to pair 31 and 59. Wiper 4D is arranged so that contacts connected to resistors 33 through 59 are make-before-break and contacts connected to the distance traveled by the vehicle is such that the by the wiper 4C. When the lead screw 4A has traversed the insulated sleeve to its maximum travel, switch 339 is opened, causing the electro-mechanical clutch 3 to be disabled. The ratio of the travel of the insulating sleeve 4B to the distance traveled by the vehicle is such that the wipers 4C, 4D, and 4E advance to the next succeeding contact as the vehicle travels a mile.

Resistors 5 through 31 and 33 through 59, capacitors 32 and 60, resistors 61 and 62, and lamps 63, 64, and 65 form the elements of a wien bridge which is the frequency determining network of the wien bridge oscillator 66. This switching assembly changes the frequency of the wien bridge oscillator in a stepwise manner, the change taking place at one mile intervals. The circuits illustrated herein control the frequency range in steps of 100 cycles from 300 to 3,000 cycles. This audio frequency voltage appears across resistor 74 and is coupled through capacitor 75 to the base of transistor 76 of a common emitter audio amplifier 90. Resistors 77 and 78 form a bias voltage divider and resistor 79 provides self bias for transistor 76. Capacitor 80 acts as an a-c bypass capacitor to ground. The signal is coupled through transformer 81 to the base of transistors 82 and 83; resistors 84, 85, 86, and 87 and capacitor 88 form a push-pull class B audio amplifier 89. The output of this amplifier is coupled through an impedance transformer 91 by way of terminal connections 92 and 93 and connecting cable 94 shown in FIG. 1 to the bases of transistors 95 and 96. Resistors 337 and 338 form a bias voltage divider for transistors 95 and 96.

The supply voltage for amplifiers 89 and 90 is obtained at terminal 97. The magnitude of the supply voltage is approximately 12 volts D-C. Capacitor 103 is an audio bypass capacitor. The plate supply voltage for the Wien bridge oscillator 66 is obtained at terminal 98. The filament supply voltage for the filament 340 of vacuum tube 67 is obtained at terminal 100. The magnitude of the plate supply voltage is approximately 150 volts D-C and the filament supply voltage is approximately 6 volts D-C. Terminal 102 has a potential of approximately 12 volts D-C present when the transmitter unit is turned off. The purpose of this voltage is to operate motor 104 which returns the mechanical switching assembly 4 to its original position. When it reaches its original position, switch 105 is opened, disabling motor 104. Terminals 92, 93, and 97 through 102 are all connected by way of cable 94 to similarly enumerated terminals on the transmitter unit as shown in FIG. 1.

The audio signal from transformer 91 is coupled to the bases of modulator transistors 95 and 96. Transistors 95 and 96 and resistor 106 comprise a class B audio amplifier which when coupled with transformer 107 will amplitude-modulate the radio-frequency power amplifier 108.

The crystal oscillator circuit 109 includes a quartz crystal 110, resistor 111, vacuum tube 112, inductor 113, and variable capacitor 114. This circuit operates at a frequency of approximately 27.255 megacycles, a third overtone frequency of the quartz crystal 110. Capacitor 115 and resistor 116 form a decoupling network for the oscillator supply. The oscillator output voltage appearing on the plate of vacuum tube 112 is coupled through capacitor 117 to the grid of vacuum tube 118. Vacuum tube 118, inductors 119, 120, and 121, resistors 122 and 123, and capacitors 124 through 128 comprise the radio-frequency power amplifier 108. Capacitor 129 is a radio-frequency decoupling capacitor for the radio-frequency power amplifier plate supply. Inductor 121, capacitors 126, 127 and 128 are a standard pi network to match the amplifier 108 to a 50 ohm antenna connected to jack 130. Capacitor 131, resistors 132 and 133 and neon lamp 134 are an R-F indicator to indicate the operation of the R-F power amplifier. A D-C to D-C converter 135 furnishes the high voltage for radio-frequency oscillator 109, radio-frequency power amplifier 108 and Wien bridge oscillator 66. Transistors 136 and 137, resistors 138 and 139, capacitor 140 and saturable core transformer 141 comprise the D-C to A-C inverter. The D-C input voltage is approximately 12 volts. The alternating current voltage at the secondary of transformer 141 is approximately 300 volts average value. Capacitor 142 suppresses the high voltage spikes appearing at the secondary of transformer 141. The A-C voltage at the secondary is rectified by diodes 143 through 150. Capacitor 151 filters the D-C output of the converter 135. The filtered output voltage of the converter is approximately 300 volts D-C and this voltage is applied through resistor 152 to the anode of the gas regulator tube 153. The voltage across the gas regulator tube 153 is fairly constant at 150 volts and is used as plate supply for the Wien bridge oscillator 66. Capacitor 154 bypasses any noise present at the regulator tube. Resistor 155 and capacitor 156 form a decoupling network for the filament of vacuum tube 67. Resistor 157, capacitors 158 and 159 form a decoupling network for the filaments of vacuum tubes 112 and 118. Capacitor 160 is the main power line bypass capacitor. Fuse 161 is a line fuse. The main transmitter power switch 162 controls the power supply. Silicon rectifier 163 will conduct if a reverse polarity voltage is applied to the power input terminal, opening fuse 161. Capacitor 164 is a line bypass capacitor for converter 135. Vacuum tube 67, capacitors 69 and 70, and resistors 71, 72, 73, and 74 comprise the Wien bridge oscillator 66.

Referring now to FIG. 3, the circuit for a receiver is illustrated therein which is intended to function with the transmitter of FIGS. 1 and 2. The amplitude modulator radio-frequency signal radiated by the antenna on the vehicle is induced in an antenna 165 connected to the receiver. Loading coil 166 serves to resonate the receiver antenna to a frequency of approximately 27.255 megacycles which is the nominal frequency of the transmitted signal. Capacitor 167 and tapped inductor 168 comprise a parallel-tuned circuit and an impedance matching network for the radio-frequency input stage 169. Transistor 170 is the first R-F amplifier and converter. Resistors 171 and 172 are the bias voltage divider for transistor 170. Capacitors 173 and 174 are R-F bypass capacitors. Inductor 175 and variable capacitor 176 comprise a parallel-tuned network tuned to the output frequency of the converter. Transistor 177 is the converter oscillator. Resistors 178 and 179 are the bias voltage divider for the oscillator and the quartz crystal 180 is the frequency determining component in the circuit. The oscillator operates at the third overtone of crystal 180, a frequency of 26.615 megacycles, 640 kilocycles lower than the R-F input signal to the converter 170. Capacitor 181 and inductor 182 are a parallel-tuned circuit resonant at approximately 26.615 megacycles. Capacitor 183 forms a fed-back loop for the oscillations. Output of this oscillator is developed across the resistor 184 and is coupled to the base of transistor 170 by capacitor 185.

The 640 kilocycle amplitude modulated R-F signal is coupled from inductor 175 to ferrite core transformer 186. Capacitor 187 tunes the primary winding of transformer 186. Capacitors 188 and 189 do not enter into the operation of the vehicle warning system. Transistor 190 is a second R-F amplifier, operating at a frequency of 640 kilocycles. Resistors 191 and 192 form the biasing network for transistor 190. Capacitors 193, 194, and 195 are R-F bypass capacitors. Capacitor 196 is an audio bypass capacitor for the automatic volume control line 197. The output is coupled from the R-F amplifier 190 through transformer 198. Variable capacitor 199 tunes the primary winding of transformer 198. Variable capacitors 200 and 201 do not enter into the operation of the vehicle warning system. Transistor 202 is the second converter stage. Resistors 203, 204, and 205 form the biasing network for transistor 202. Capacitor 206 is a D-C blocking capacitor and capacitor 207 is an R-F bypass capacitor for the emitter of transistor 202. Capacitor 208 and transformer 209 form the oscillator tank circuit for the converter 202. Output from the converter stage 202 is coupled from ransformer 209 to the series-tuned circuit composed of inductor 210, capacitor 211 and transformer 212. Capacitors 213 and 214 do not enter into the operation of the vehicle warning system. Capacitor 215 tunes the secondary winding transformer 212 to a frequency of 456 kilocycles. Resistors 216 and 217 form a biasing network for the first I-F amplifier transistor 218. Capacitors 219, 220, and 221 are R-F bypass capacitors. Capacitor 222 tunes the primary winding of transformer 223 to a frequency of 456 kilocycles and capacitor 224 is for neutralization of transistor 218. The output of the first I-F amplifier 218 is coupled to the base of the second I-F amplifier transistor 225 by way of transformer 223. Resistors 226 and 227 form the biasing network for transistor 25. Capacitors 28, 229, and 230 are R-F bypass capacitors. Capacitor 31 tunes the primtry winding of transformer 32 to a frequency of 456 kilocycles. Capacitor 233 serves to neutralize transistor 225.

The output of transformer 232 is rectified by diode 234. This rectified amplitude modulated radio-frequency causes audio frequency currents to flow through the automatic volume control amplifier transistor 235 from its emitter to its base. This causes an audio frequency voltage to appear across resistors 236, 237, and 238. The average value of this audio frequency voltage is used to control the gain of transistors 190 and 218. Capacitors 239 and 240 are R-F bypass capacitors. The audio frequency which flows through diode 234 also flows through resistors 241 and 242.

The audio frequency voltage appearing at the ungrounded end of resistor 242 is coupled to the base of transistor 243 by capacitor 244. Resistors 245, 246, and 247 form the biasing network for transistor 243. The audio signal is amplified and appears at the collector of transistor 243. Resistor 248 is the collector load resistor for transistor 243. Although the D-C level on the collector transistor 243 may vary between 0 and 12 volts, the A-C variations are small due to the low reactance of capacitor 249. Variations in A-C are not permitted to exceed the forward voltage drop of diodes 250 and 251 because of the back-to-back connection of these diodes. Since without the diode-limiting circuit, the A-C variation at the collector transistor 243 will approach a peak-to-peak amplitude of approximately 10 times the forward voltage drop of the diodes, the diode-limiting circuit insures that the output of the first audio amplifier transistor 243 will be of a fairly constant voltage even through the voltage would normally vary over a wide range.

The audio signal is coupled through capacitor 252 and isolating resistor 253 to the feedback network consisting of capacitors 254, 255, and 256, resistors 257, 262, and 267. Resistors 272, 273, 274, 275, 262 and 267, capacitors 254, 255 and 256 and transistors 276 and 277 are components of a regenerative amplifier. The regenerative amplifier has comparatively low gain over a wide range of frequencies, but in a narrow band of frequencies the phase shift of signal voltage through a phase shifting network will be sufficient to cause an increase in the gain of the amplifier. Switch 278 selects sets of three resistors which comprise the phase shift network for one particular frequency. The same capacitors 254, 255, and 256 may be used for up to five closely spaced frequency steps, requiring only that resistors of the phase shift network be changed. Resistors 258, 268, and 263 are the second set of resistors which may be selected. Resistors 259, 269 and 264 are the third set which may be selected. Resistors 260, 270, and 265 are the fourth set which may be selected. Resistors 261, 271, and 266 are the fifth set of resistors which may be selected. Resistors 267 through 271 may be varied to change the magnitude of the feedback.

Output of the regenerative amplifier appearing across resistor 275 is coupled through capacitor 279 and isolating resistor 280 to the base of the second audio amplifier transistor 281. Resistors 282, 283, and 284 form a voltage divider biasing network for transistor 281. Capacitor 285 is an audio bypass capacitor for the collector of transistor 281. Output of the second audio amplifier appears across resistors 286 and 287. The magnitude of the output may be adjusted by varying resistor 287.

The output of the second audio amplifier is coupled through capacitor 288 to the base of the third audio amplifier transistor 289. Resistors 290, 291 and 292 form the biasing network for transistor 289. Capacitor 293 is an audio bypass capacitor. Output of the third audio amplifier 289 is coupled through an impedance transformer 294 to the base of the relay driver transistor 295. An audio signal at the base of transistor 295 will cause the transistor to conduct, allowing current to pass through relay 296. Relay 296 closes the normally open contacts 297 causing an electromagnetic buzzer 298 to sound.

Small amounts of radio frequency voltage appearing at the contacts of the buzzer are coupled into the receiver and are amplified as a normal signal would be. This noise voltage from the buzzer is sufficient in harmonic content to cause the regenerative amplifier to have an output. This action causes a latching effect and the alarm will sound until the reset button switch 299 is depressed, causing transistor 295 to cease conduction, contacts 297 to open, and buzzer 298 to stop operation. Capacitor 300 causes relay 296 to be insensitive to signals of a short duration. Resistor 301 and capacitor 302 form a decoupling network for the relay circuitry.

Battery 303 furnishes operating voltage for the first, second and third audio amplifiers, the first r-f amplifier and converter, the converter oscillator, regenerative amplifier, the relay driver and buzzer. Voltage of battery 303 is approximately 12.6 volts D-C. Battery 304 furnishes operating voltage for the second R-F amplifier, second converter and first and second I-F amplifier and the automatic volume control amplifier. Resistors 305 and 306, capacitors 307, 308, and 309 form decoupling networks for the battery supply voltage. Resistor 335 is a dropping resistor for the converter voltage.

Components numbered with designations 310 through 336 do not enter into the operation of the vehicle warning system. These components which are shown on the diagram and which do not enter into the operation of the vehicle warning system are used only when the equipment is used as standard AM broadcast radio. Circuitry used when the equipment is used as an AM broadcast radio is similar in construction to that used in many commercially available transistor portable AM broadcast receivers.

By way of example only, the specifications and values of circuit components which may be used in this invention are as follows:

PARTS LIST

| Item, part Nos.: | Type or value |
|---|---|
| Battery: | |
| 304 | 6 volt. |
| 303 | 12.6 volt. |

PARTS LIST.—Continued

| Item, part Nos.: | Type or value |
|---|---|
| Capacitors: | |
| 215 | Part of 212. |
| 222 | Part of 223. |
| 231 | Part of 232. |
| 131 | 2 picofarad. |
| 224, 233 | 3 picofarad. |
| Capacitor, adjustable: 167 | 3–25 picofarad. |
| Capacitors, adjustable: 126, 127 | 3.7–52 picofarad. |
| Capacitor: 185 | 5 picofarad. |
| Capacitors, adjustable: | |
| 188, 201, 214 | 5–15 picofarad. |
| 114 | 10–100 picofarad. |
| 176, 189, 199, 208 | 35–250 picofarad. |
| Capacitors: | |
| 128, 249, 293, 241 | 50 picofarad. |
| 117, 181, 183 | 56 picofarad. |
| 211 | 400 picofarad. |
| 32, 60, 124, 125, 129, 142 | 0.001 microfarad. |
| 88, 115, 156, 159, 160 | 0.005 microfarad. |
| 206, 207, 240, 252, 254, 255, 256 | 0.01 microfarad. |
| 173, 193, 194, 195, 219, 221, 229, 230, 309. | 0.02 microfarad. |
| 158 | 0.025 microfarad. |
| 220, 228 | 0.04 microfarad. |
| 154 | 0.047 microfarad. |
| 174 | 0.05 microfarad. |
| 336A | 1 microfarad. |
| 69, 70, 151, 244 | 2 microfarad. |
| 140 | 4 microfarad. |
| 75, 279 | 5 microfarad. |
| 285, 288 | 15 microfarad. |
| 80 | 25 microfarad. |
| 196, 239 | 30 microfarad. |
| 300, 302, 307 | 100 microfarad. |
| 308 | 200 microfarad. |
| 103, 164 | 250 microfarad. |
| Coil, loading 166 | 0.9–1.6 microhenries. |
| Crystal: | |
| 110 | 27.255 megacycles. |
| 180 | 26.615 megacycles. |
| Diodes: | |
| 143, 144, 145, 146, 147, 148, 149, 150. | 1N2071. |
| 163 | 1N2069. |
| 234 | 0A90. |
| 250, 251 | 1N118 |
| Inductor: | |
| 113 | ca. 0.35 microhenry. |
| 121 | ca. 0.6 microhenry. |
| 182 | ca. 0.7 microhenry. |
| 119, 120 | 8.2 microhenry. |
| Lamp, neon 134 | NE-2. |
| Lamps 63, 64, 65 | 230 volt, 10 watt. |
| Relay 296 | 2,300 ohms, 4.6 milliampere. |
| Resistors, precision: | |
| 31, 59 | 56,200 ohms. |
| 30, 58 | 57,600 ohms. |
| 29, 57 | 60,400 ohms. |
| 28, 56 | 61,900 ohms. |
| 27, 55 | 63,400 ohms. |
| 26, 54 | 66,500 ohms. |
| 25, 53 | 69,800 ohms. |
| 24, 52 | 73,200 ohms. |
| 23, 51 | 76,800 ohms. |
| 22, 50 | 80,600 ohms. |
| 21, 49 | 84,500 ohms. |
| 20, 48 | 88,700 ohms. |
| 19, 47 | 95,300 ohms. |
| 18, 46 | 100,000 ohms. |
| 17, 45 | 107,000 ohms. |
| 16, 44 | 115,000 ohms. |
| 15, 43 | 124,000 ohms. |

PARTS LIST.—Continued

| Item, part Nos.: | Type or value |
|---|---|
| Resistors, precision: | |
| 14, 42 | 133,000 ohms. |
| 13, 41 | 147,000 ohms. |
| 12, 40 | 162,000 ohms. |
| 11, 39 | 178,000 ohms. |
| 10, 38 | 200,000 ohms. |
| 9, 37 | 232,000 ohms. |
| 8, 36 | 267,000 ohms. |
| 7, 35 | 324,000 ohms. |
| 6, 34 | 402,000 ohms. |
| 5, 33 | 536,000 ohms. |
| Resistors: | |
| 106 | 0.11 ohm. |
| 337 | 3.3 ohms. |
| 139 | 7.5 ohms. |
| 155 | 21 ohms. |
| 86, 87 | 47 ohms. |
| 184, 301 | 100 ohms. |
| 305, 306 | 120 ohms. |
| 138 | 160 ohms. |
| 292, 338 | 220 ohms. |
| 274 | 430 ohms. |
| 79, 192, 286 | 470 ohms. |
| 291 | 560 ohms. |
| 84 | 620 ohms. |
| 216, 226 | 680 ohms. |
| 227 | 820 ohms. |
| 61, 191, 241 | 1000 ohms. |
| Resistors, adjustable 74, 207, 208, 269. | 0–1000 ohms. |
| Resistors: | |
| 205 | 1,200 ohms. |
| 217 | 1,800 ohms. |
| Resistor, adjustable 62 | 0–2000 ohms. |
| Resistors: | |
| 257, 258, 259, 260, 261, 275, 280, 284, 335 | 3,300 ohms. |
| 237, 247 | 3,900 ohms. |
| 246 | 4,300 ohms. |
| 204, 273, 283 | 4,700 ohms. |
| Resistors, adjustable 262, 263, 264, 265, 266, 287. | 0–5000 ohms. |
| Resistors: | |
| 242 | 5,600 ohms. |
| 152 | 6,000 ohms. |
| 78 | 6,200 ohms. |
| 72, 116, 171, 290 | 10,000 ohms. |
| 236 | 15,000 ohms. |
| 71 | 20,000 ohms. |
| 123, 179 | 22,000 ohms. |
| 178 | 27,000 ohms. |
| 122, 203 | 33,000 ohms. |
| 111 | 47,000 ohms. |
| 77, 172, 282 | 56,000 ohms. |
| 85 | 62,000 ohms. |
| 238, 248 | 68,000 ohms. |
| 132, 272 | 100,000 ohms. |
| 245 | 150,000 ohms. |
| 133 | 470,000 ohms. |
| 73 | 500,000 ohms. |
| 253 | 1,500,000 ohms. |
| Transistors: | |
| 76 | 2N388. |
| 82, 83 | 2N109. |
| 95, 96, 136, 137 | 2N278. |
| 170, 177 | 2N3563. |
| 190, 202 | 2SA102. |
| 218, 225 | 2SA101. |
| 235 | 2SB170. |
| 243, 281 | 2N1301. |
| 276, 277 | 2N404. |
| 289, 295 | 2N1274. |
| 336B | |

PARTS LIST.—Continued

| Item, part Nos.: | Type or value |
|---|---|
| Tubes, vacuum: | |
| 67 | 6021. |
| 112 | 6417. |
| 118 | 2E26. |
| Tube, regulator 153 | 0A2. |

SPECIAL PARTS LIST

| Item, part Nos.: | Type or value |
|---|---|
| Capacitor 213 | Not used in system. |
| Capacitor 200 | Not used in system. |
| Coil, transistor-oscillator, miniature 209. | 1000–2050 kilocycles. |
| Components, miscellaneous 310–334. | Not used in system. |
| Inductor, ferrite core 175. | ca. 500 millihenries. |
| Inductor, ferrite core 186. | Primary inductance ca. 700 millihenries; secondary impedance ca. 200 ohms. |
| Inductor, tapped 168 | ca. 2 microhenry total, turns ratio 1:3. |
| Transformer, I.F. miniature transistor 210, 212, 223, 232. | 455 kilocycles. |
| Transformer, transistor audio 294. | Primary impedance 10,000 ohms; secondary impedance 2,000 ohms. |
| Transformer, transistor audio 81. | Impedance ratio=10,000 ohms primary; 2,000 ohms center-tapped secondary. |
| Transformer, transistor audio 91. | Impedance ratio=40 ohms center-tapped primary; 16 ohms center-tapped secondary. |
| Transformer, modulation 107. | Secondary impedance= 3,000 ohms; primary impedance 9 ohms center-tapped. |

SPECIAL PARTS LIST.—Continued

| Item, part Nos.: | Type or value |
|---|---|
| Transformer, toroidally wound inverter, special saturable core 141. | Input: 12 volts D.C. current; output: 320 volts, alternate current root means square. |

What is claimed is:

1. A signal apparatus for indicating the location of a moving vehicle along its route of travel comprising a switch means associated with the chassis of the vehicle and disposed in a transmitter for selecting a signal generating circuit and controlling the signal emitted therefrom, a predetermined signal being transmitted at designated locations along the route, a receiver for such signals, said receiver having circuitry pretuned to said predetermined signals, and indicator means associated with each pretuned circuit for providing an indication of the reception of each of said signals and the location of the vehicle carrying the transmitter.

2. The method of signaling the location of a vehicle along a predetermined route comprising the steps of controlling the modulation of a radio frequency carrier by varying the modulation at predetermined locations along the route, transmitting said carrier to one or more receivers, detecting and amplifying the modulation in the receiver, and actuating an audible signal apparatus sensitive to preselected modulations, said audible signals indicating the location of the vehicle.

References Cited

UNITED STATES PATENTS

| 2,769,977 | 11/1965 | Roberts et al. | 343—112 |
| 3,004,258 | 10/1961 | Cohen et al. | 343—112 |

ALVIN H. WARING, Primary Examiner

U.S. Cl. X.R.

325—29, 111